United States Patent [19]

Harris, Jr.

[11] 4,195,328

[45] Mar. 25, 1980

[54] OPEN VEHICLE LIGHTING SYSTEM UTILIZING DETACHABLE VEHICLE OPERATOR HELMET MOUNTED LIGHT

[76] Inventor: William R. Harris, Jr., 109 Wilton Rd., Westport, Conn. 06880

[21] Appl. No.: 916,513

[22] Filed: Jun. 19, 1978

[51] Int. Cl.$^2$ ............................................. F21V 33/00
[52] U.S. Cl. ..................................... 362/72; 362/106; 362/226
[58] Field of Search ................. 362/72, 105, 106, 157, 362/226

[56] References Cited

U.S. PATENT DOCUMENTS

| | | | |
|---|---|---|---|
| 1,393,158 | 10/1921 | Pawsat | 362/72 X |
| 2,788,439 | 4/1957 | Hesse | 362/106 X |
| 3,087,049 | 4/1963 | Schecter | 362/105 |
| 3,309,691 | 3/1967 | Bonanno | 362/106 X |
| 3,852,587 | 12/1974 | Koehler | 362/106 |
| 3,947,676 | 3/1976 | Battilana et al. | 362/157 X |
| 4,075,469 | 2/1978 | Alphen | 362/72 |
| 4,090,232 | 5/1978 | Golden | 362/105 X |

*Primary Examiner*—Peter A. Nelson
*Attorney, Agent, or Firm*—St. Onge, Steward, Johnston, Reens & Noe

[57] ABSTRACT

A lighting system for an open vehicle such as a motorcycle or snowmobile incorporating the main headlight which is rigidly secured to the vehicle, and an auxiliary headlight detachably mounted on the safety helmet worn by the vehicle operator and detachably connected, by electrical circuit connecting means to a mutual power source carried on the vehicle and simultaneously operable by the main lighting switch located on the vehicle for easy access by the vehicle operator, to project an auxiliary beam of light in conjunction with the beam of light projected by the main headlight. The auxiliary headlight is capable of projecting the auxiliary beam of light in a plurality of directions independent of the direction of the beam of light of the main headlight. The main headlight and the auxiliary headlight are spaced apart so as to project two distinct separate sources of light when viewed from a remote location. The auxiliary headlight is detachably mounted by means of snap fasteners or by means of other detachable fastening means so as to be readily freed, under the force of impact, from the helmet.

The auxiliary headlight is adjustable with respect to the helmet to compensate for slight variations from driver to driver in achieving a comfortable fitting of the helmet with proper beam alignment to the line of sight. In one embodiment of mounting, the auxiliary headlight is adjustable about a line along the periphery of the helmet to provide adjustability of the beam of light. The auxiliary headlight may contain a headlight as well as a parking light and the two may be connected in an electrical circuit with the conventional lighting system of the vehicle so that the auxiliary headlight is on when the high beam of the vehicle main headlight is on and the amber parking light is on when the low beam of the vehicle main headlight is on.

10 Claims, 10 Drawing Figures

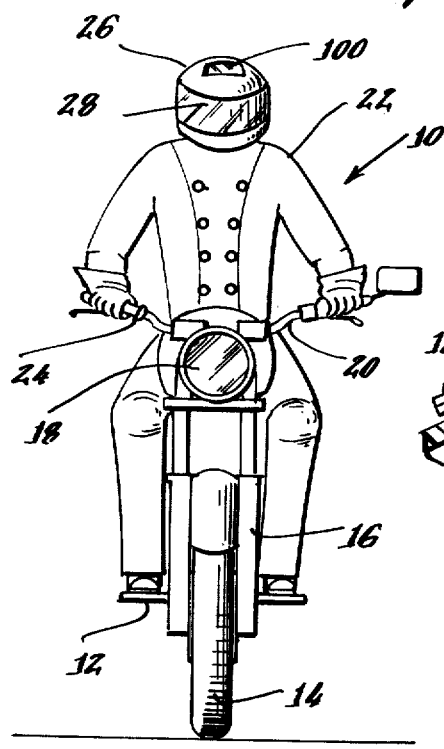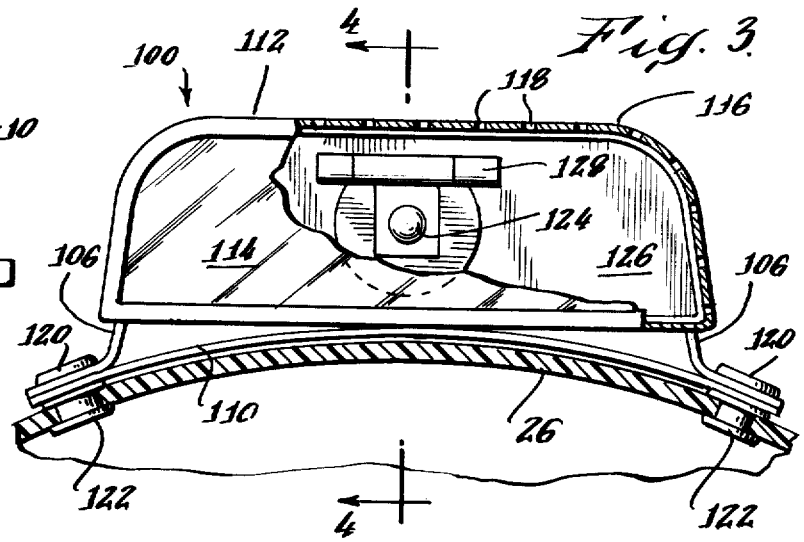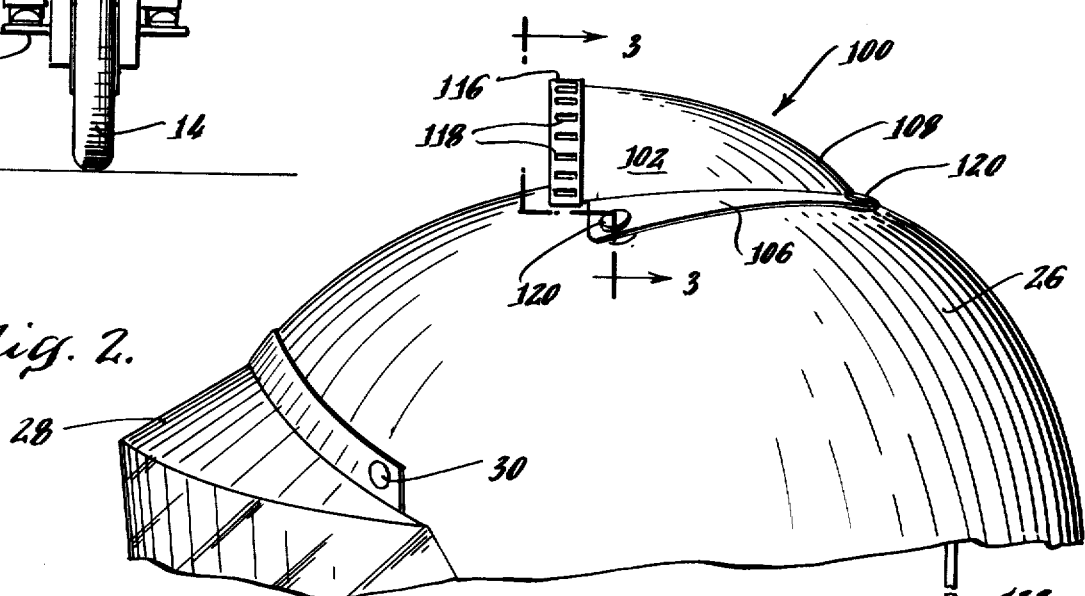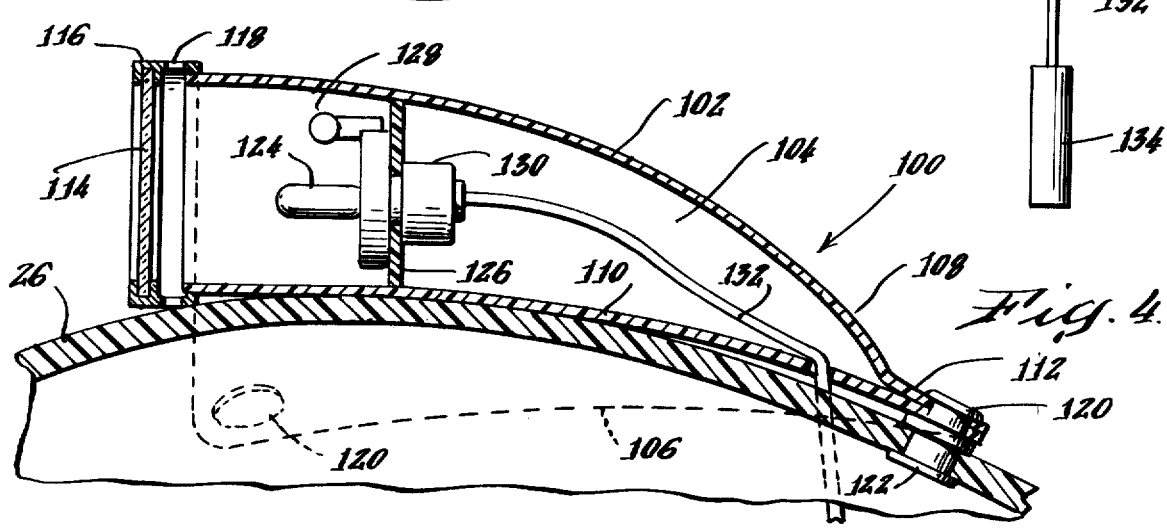

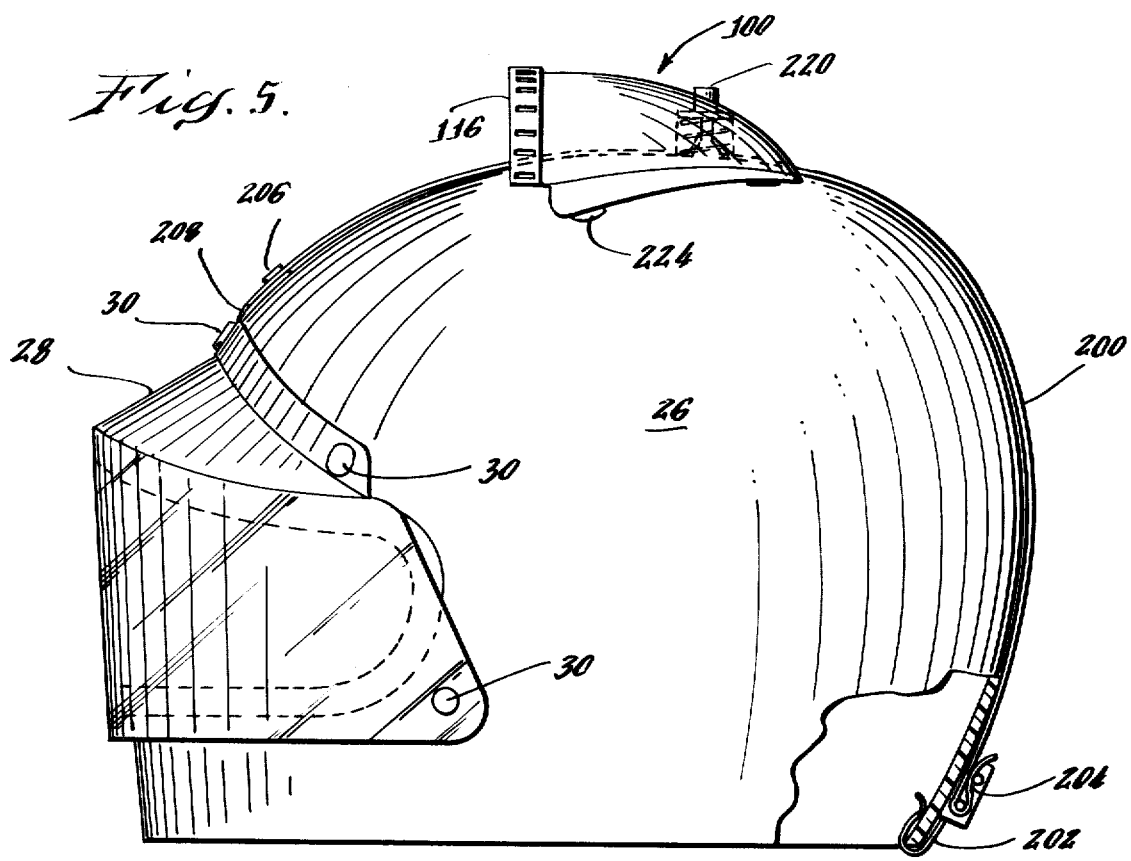
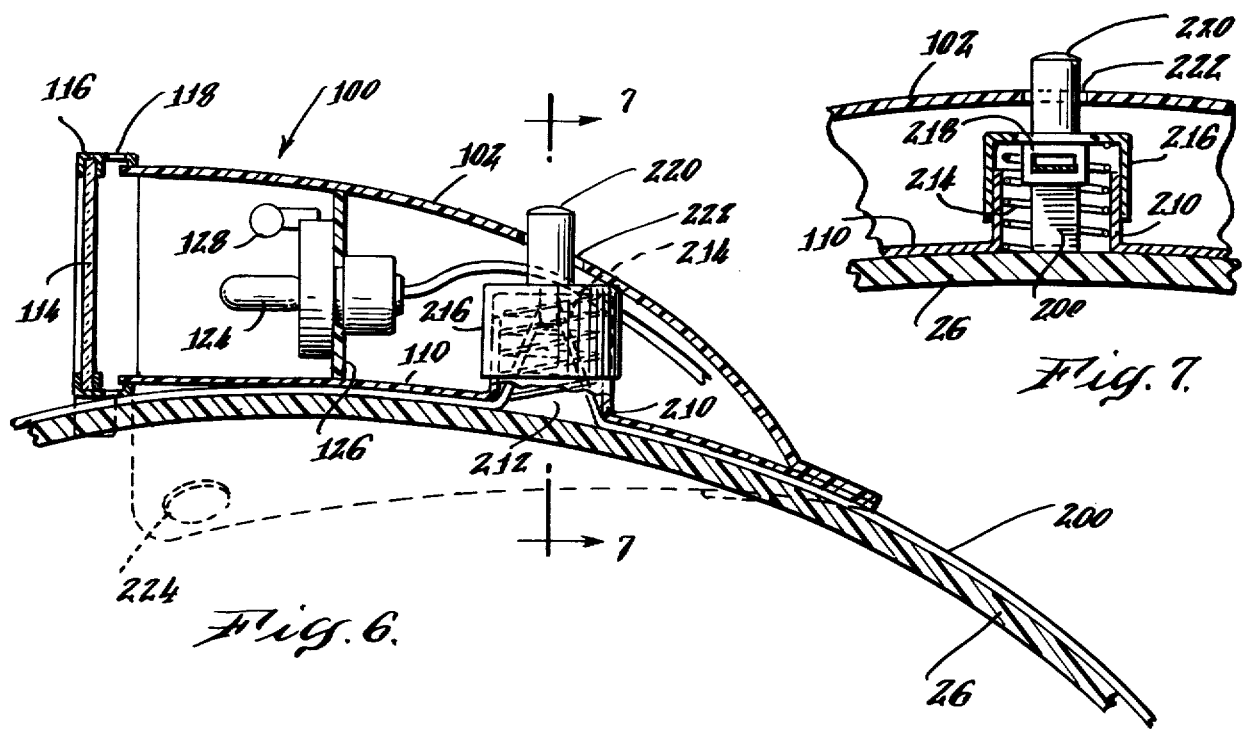

OPEN VEHICLE LIGHTING SYSTEM UTILIZING DETACHABLE VEHICLE OPERATOR HELMET MOUNTED LIGHT

BACKGROUND OF THE INVENTION

1. Field of the Invention

My invention relates to a lighting system for an open vehicle in which the operator is exposed to the vehicle surroundings, such as a motorcycle or snowmobile, having a main headlight rigidly secured to the vehicle. My invention relates more particularly to such a lighting system employing an auxiliary headlight which is detachably mounted on a helmet worn by the vehicle operator and is capable of projecting a beam of light in plurality of directions independent of the beam of light projected by the main headlight.

2. Description of the Prior Art

The conventional lighting system for an open vehicle carrying an exposed operator, such as a motorcycle or snowmobile, that has found practical commercial application utilizes a single main headlight which is rigidly fixed to the front wheel fork of of the vehicle or to the vehicle frame itself so as to project a beam of light forward in the path of travel of the vehicle. This projected beam of light is not generally adjustable for direction of projection during vehicle operation, except perhaps for projection on either low or high beam, since the direction is governed by the directing influence of the vehicle portion to which the headlight is rigidly attached. As a consequence, it frequently occurs that the true immediate path of travel of the vehicle is not properly illuminated thus constituting a hazard to the safety of operation of the vehicle and to the exposed operator whose nighttime visibility of the path ahead is necessarily limited.

For example, in the operation of a motorcycle the main headlight projects a beam directly forward of the motorcycle and is quite satisfactory when the motorcycle travels a straight path. However, in travelling a curved path, such as around a bend in a road, the motorcycle "leans" through the curve rather than proceeding through the curve solely by turning its front wheel. As a consequence, the main headlight of the motorcycle projects a beam which does not illuminate the immediate path of travel ahead of the motorcycle but rather is directed straight ahead or off to the side. Thus, the road directly ahead of the motorcycle in the curve is not illuminated by the main headlight although such is the path of travel which the motorcyclist must view as to hazards in the road, oncoming cars and the like. Moreover, the main headlight, being essentially rigidly secured to the motorcycle, is subjected to all the impacts and vibrations to which the motorcycle itself is subjected so that frequently, such as on rough road surfaces, the projected beam is not steady but rather vibrates along with the motorcycle.

A motorcycle lighting system also includes secondary lights, such as tail and brake lights as well as parking-type lights mounted outboard of the main headlight. Heretofore, it has been proposed to augment the motorcycle lights through the use of lighting devices adapted for use with helmets which are worn by the motorcycle operator.

U.S. Pat. No. 3,793,517 discloses a lighting device for a safety helmet for an operator of a motorcycle and describes and critizes various alleged prior art attempts at such devices. That patent proposes a lighting device disposed within a housing, carried on the top portion of the helmet, which is triangular in shape to form a streamline contour and has a lens disposed at the rear end of the housing to direct light rearwardly of the helmet body. The housing is permanently affixed to the helmet or formed as an integral portion thereof and includes its own power source, such as batteries. Radially extending lenses on the housing may direct light from the sides and front portion by virtue of the translucent nature of the lens. The rearward projection of light is through a red lens and the radially extending lenses are yellow. It is apparent that the proposal in U.S. Pat. No. 3,793,517 does not serve to overcome the problems associated with a main headlight lighting system as described above since no beam of headlight intensity is projected forward to illuminate the road ahead. Moreover, the use of a self-contained power source such as the conventional dry cell batteries disclosed is generally inadequate to provide the power required for a high intensity headlight beam and moreover requires that a separate switch be provided on the lighting device or the helmet itself so that coordination with the lighting system of the motorcycle is not readily obtainable. Nevertheless, the patentee states that lighting devices which have used energizing means for the light source that are mounted exteriorly of the helmet and require wires to transmit power from remote energizing means to the light source are undesirable.

A helmet or hat mounted illuminating means has been previously proposed. U.S. Pat. No. 2,705,751 shows a cap in which a circular bracket carrying a plurality of electric light bulbs is mounted on a conventional military type hat such as may be worn by a uniformed orchestral band member to provide a decorative appearance. The bulbs may be switched on by the wearer from a switching means located remote from the cap on the belt of the wearer. The energizing means is also located on the belt of the wearer and the electrical connection between the two includes electrical connecting means provided with a prong and socket connector for separation. U.S. Pat. No. 3,749,902 shows several light means forming a permanent part of a safety hard hat with a separable connection to a power source carried on the belt of the wearer. A flasher switching means is provided within the helmet mounting for the lamp.

Thus, while it can be seen that various types of lighting devices and illuminating means have been provided for use with head gear and helmets, none of them are directed to overcoming the disadvantages present in the conventional lighting system found on a vehicle such as a motorcycle which prevents adequate illumination of the road directly ahead of the motorcycle during various times of use. Moreover, nothing has heretofore been proposed which provides an effective motorcyle helmet mounted headlight which is readily detachable therefrom and is connected to the power source and electrical circuit of the main headlight of a conventional motorcycle lighting system to operate in conjunction therewith. Accordingly, the disadvantages and drawbacks associated with conventional open vehicle lighting systems currently remain in commercial applications.

SUMMARY OF THE INVENTION

My invention overcomes the disadvantages associated with the conventional lighting system of an open vehicle such as a motorcycle and provides a lighting system that enables improved illumination of the path traveled by the motorcycle, irrespective of whether it is straight or curved or over a smooth or rough surface, enables greater visibility of the motorcycle from a distance, and increases its safety of operation.

These advantages are achieved, according to my invention, through the provision of a lighting system including a main headlight rigidly secured to the vehicle for projecting a beam of light forward of the vehicle, connected to the power source carried on the vehicle and operable by a switch located on the vehicle for easy access by the operator and an auxiliary headlight detachably mounted on the helmet worn by the vehicle operator and detachably connected, by electrical circuit connecting means, to the power source and switch of the vehicle and activatable by the operator to project an auxiliary beam of light in conjunction with the beam of light projected by the main headlight.

The auxiliary headlight is capable of projecting the auxiliary beam of light in a plurality of directions independent of the direction of the beam of light of the main headlight and at the discretion of the vehicle operator during conditions of vehicle use. The main headlight and the auxiliary headlight are spaced apart in a vertical plane normal to the path of travel of the vehicle so as to project two distinct separate sources of light when viewed from a remote location in the forward path of travel of the vehicle so as to better enable oncoming vehicles to determine the distance between them and the open vehicle based on the increasing or diminishing space between the two separate point sources of light.

The auxiliary headlight is detachably mounted on the helmet so as to be removable during daytime use if desired. The mounting is by means of snap fasteners of the type presently used for fastening the helmet visors or by means of other detachable fastening means, including adhesive-type and so-called "Velcro" fasteners, those employing suction, and other equivalent known means, so as to be readily freed, under the force of impact, from the helmet in the case of an accident. These may have adjustability so that the auxiliary headlight can be mounted on the helmet to suit the particular wearer. In one embodiment of the mounting, the auxiliary headlight is adjustable about a line along the periphery of the helmet to provide adjustability of the beam of light that will be projected therefrom.

The auxiliary headlight may contain a conventional halogen quartz lamp for bright illumination as a headlight as well as an amber parking light and the two may be connected in an electrical circuit with the conventional lighting system of, e.g., a motorcycle so that the auxiliary headlight is on when the high beam of the motorcycle main headlight is on and the amber parking light is on when the low beam of the motorcycle is on so that oncoming vehicles will not be blinded. The auxiliary headlight is connected, to the electrical system for the motorcycle lighting system by means of a cord having a snap-fit break-a-way connection so that in the event that the operator is involved in an accident and is thrown free of the motorcyclist the connection is broken without any injury. However, at the same time, the auxiliary headlamp possesses the advantages of both lightweight and high intensity of beam since it does not need to contain its own power source but rather utilizes the power source of the electrical system of the motorcycle.

In addition to the advantages of lightweight and ready detachability, the auxiliary headlamp and lighting system according to this invention provide several other advantages. Thus, when a vehicle such as a motorcycle turns a corner or bend in the road by leaning through it rather than through an abrupt turn of the front wheel, so that the road area directly ahead is not lighted, the auxiliary headlight mounted on the helmet of the operator will follow the line of vision of the operator and illuminate the immediate path ahead. Also, when the main headlamp of the motorcycle vibrates due to a rough road surface, the auxiliary headlight mounted on the helmet will not undergo the same intensity of vibration due to the natural damping effect of the human body. An important safety advantage is the fact that the two sources of light, when viewed by operators of oncoming vehicles, will enable them to better judge their distance from the motorcycle since the two point sources appear closer together or further apart depending on the distance from the oncoming vehicle. In contrast, the present single source of light makes it virtually impossible to estimate the distance.

Therefore, a feature of the present invention is the provision of improved lighting system for an open vehicle, such as a motorcycle or snowmobile, carrying an operator exposed to the vehicle surroundings.

Another feature of this invention is the provision of an auxiliary headlamp which is detachably mounted on the helmet of the exposed operator of an open vehicle.

A further feature of this invention is the provision of a source of light which is adjustably detachably mounted on the helmet of the operator of a vehicle and which is detachably connected to the electrical power source and lighting system switch activating means of the vehicle itself.

Yet another feature of this invention is the provision of a lighting system for a motorcycle utilizing, in conjunction with the motorcycle main headlight, an auxiliary headlamp detachably mounted on the helmet of the motorcycle operator and detachably connected to the electrical system of the motorcycle for operation for illumination in conjunction with the operation of the main headlamp light of the motorcycle.

The foregoing and other features, advantages and objects of my invention will become further apparent to those skilled in the art from the following description of embodiments thereof taken in conjunction with the accompanying drawings.

BRIEF DESCRIPTION OF THE DRAWINGS

FIG. 1 is a pictorial representation of a motorcycle carrying an operator embodying the lighting system of the present invention;

FIG. 2 is a side elevation view of a portion of a helmet of the type worn by a motorcycle operator having detachably mounted thereon an auxiliary headlight according to an embodiment of this invention;

FIG. 3 is a front view, partly in section, taken along the line 3—3 of FIG. 2, of the auxiliary headlight shown in FIG. 2;

FIG. 4 is an enlarged side view, partly in section, showing the internal details of the auxiliary headlight illustrated in FIG. 2;

FIG. 5 is a side elevation view showing a means of mounting the auxiliary headlight on the helmet according to another embodiment of this invention;

FIG. 6 is an enlarged view, partly in section, showing the internal details of the auxiliary headlight illustrated in FIG. 5;

FIG. 7 is a detail view, partly in section, taken along the line 7—7 of FIG. 6, showing the auxiliary headlight mounting means in further detail;

DESCRIPTION OF THE PREFERRED EMBODIMENTS

Figure 8:
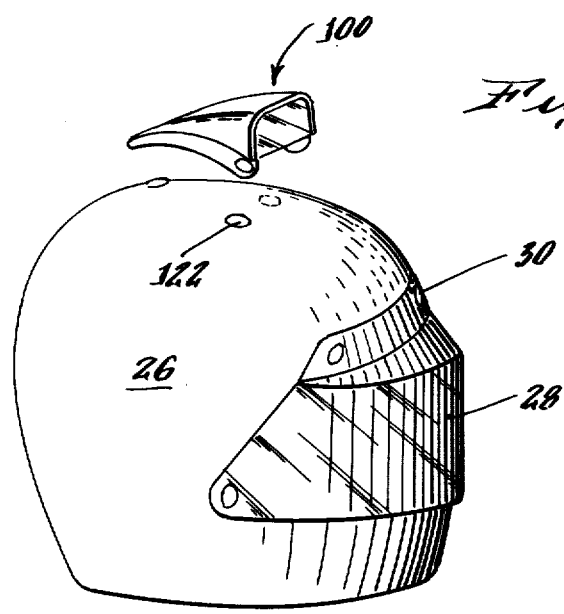
FIG. 8 is an exploded perspective view of a helmet and auxiliary headlight showing the detachability of the auxiliary headlight.

Referring to FIG. 1, there is shown an open vehicle, in this case a motorcycle, carrying an operator exposed to the vehicle surroundings, all of which are generally designated by the numeral 10. The motorcycle 12 is of conventional construction and need not be described further with the exception of pointing out that it includes a front wheel 14 carried by a fork 16 to the stem of which is also mounted a main headlight 18. The fork 16 is rotated by the turning of the handle bars 20 by the operator 22, which in turn changes the direction of the front wheel 14 and at the same time changes the direction in which the main headlight 18 is aimed. The handle bars 20 also carry a switch 24 by which the operator 22 may cause the main headlamp 18 to be switched on or off as well as to be changed from low to high beam.

The motorcycle operator 22 wears a safety helmet 26 of any one of the several hard shell types which are well known. The helmet 26 also includes a visor 28 which is fastened to the helmet by means of snap fasteners 30 (FIG. 2 and FIG. 5). An auxiliary headlight designated generally by the numeral 100 is mounted on the helmet 26 and together with the main headlight 18 forms a lighting system for the motorcycle 12.

Turning now to FIGS. 2 through 4, the auxiliary headlight 100 includes a housing 102 which may be fabricated from any suitable material which can be shaped or formed such as high impact plastic or other plastic materials, metals such as aluminum, and the like. The housing 102 defines an internal space 104 in which are mounted the electrical lighting elements as will be described in greater detail below. Depending from the housing 102 are mounting flanges 106 for securing the auxiliary headlight 100 to the helmet 26.

The housing 102 may be of one piece integral construction or, alternatively, may comprise a top portion 108 which includes the mounting flanges 106 and a bottom portion 110, with the two being joined at the bottom portion edge, as illustrated in FIG. 4 at 112. A transparent lens 114 of the type used in a headlight is mounted within a lens frame 116 which also serves as a front cover for the auxiliary headlight 100. The lens frame 116 can be attached to the housing 102 by any suitable means including fasteners, snap fit, or friction fit as illustrated in FIG. 4. In the embodiment of the lens cover shown, a plurality of slots 118 are located on the periphery of the lens cover 116 so as to permit the dissipation of any internal heat from the lighting elements.

In the embodiment illustrated in FIGS. 2 through 4, the auxiliary light 100 is mounted on the helmet 26 by means of snap fasteners 120 which are of the conventional type utilized currently for the attachment of a visor, such as 28, to a safety helmet 26. That is, there is permanently attached to the helmet 26 rivet-like means 122 which project through the helmet shell to carry a button portion over which the snap 120 of the auxiliary light 100 fits in mating fashion to form a secure but detachable attachment of the two.

The snap-fit attachment is sufficiently secure to maintain the auxiliary headlight in place during use in operation of the motorcycle to permit it to be readily removed by hand such as for removal during daytime use or to be removed under the force of a sudden impact in the event of an accident or in the event that the auxiliary headlight strikes an object which does not strike the helmet. In this manner, the auxiliary headlight will break free from the helmet without any injury to the operator.

The auxiliary headlight 100 contains, within the space 104, a halogen quartz lamp 124 which together with a reflector 126 throws a bright beam sufficient for use as a headlight to illuminate the path ahead of the motorcycle. Of course, it is understood that other lighting elements which are also capable of throwing a headlight beam may be utilized. In addition to the halogen quartz lamp 124, a smaller amber-colored lamp 128 sufficiently bright to be visible from afar is present to function as a parking light. Both the amber lamp 128 and the halogen quartz lamp 124 are mounted on the reflector 126 and connected to suitable electrical connecting means 130 which, by means of a power cord 132 and a plug-like or other readily detachable break-a-way connecting fitting means 134, is connected to the electrical system of the motorcycle 12.

The power cord 132 may be conveniently attached to a cord at the nape of the neck of the operator 22 by means of a snap-fit, break-a-way connection, enter the operator's jacket or shirt and exit at the waist where it can plug, through means of another snap-fit, break-a-way connection, to a recepticle at a convenient location on the motorcycle frame behind the operator. In this manner, break-a-way connections are provided at two locations to assure ready detachability when it is desired to remove the auxiliary headlight 100 or in the event that it becomes necessary, to quickly detach the auxiliary headlight in the case of an accident in order to avoid injury. Thus, the snap-fit, break-a-way connection is selected such that it will separate and detach upon application of a force or impact which might be encountered in an accident prior to any injury occurring.

FIGS. 5 through 7 illustrate another embodiment of means for detachably mounting the auxiliary headlight 100 to the helmet 26. In this embodiment, a strap 200, which may be fabricated of nylon and be of any suitable width such as, for example, one-half inch, is positioned around the periphery of the helmet 26 extending from the rear where the helmet fits the nape of the neck to the front to a position proximate the attachment of the visor 28. The strap 200 is attached to the helmet rear by means of a hook 202 positioned over the helmet shell which supports a roller locking means 204 of the type normally employed for seat belt adjustments and through which the strap 200 passes. At the front of the helmet, the strap is attached by means of a snap-fit connector 206 to a hook 208 which is secured around the fastener 30 for the visor 28. Alternatively, the helmet itself may contain a snap-fit connector at the location of 206 so that the hook 208 may be eliminated. The purpose of the snap-fit at 206 is to provide ready detachability through a break-a-way connection in the event that the same becomes necessary because of a force or impact encountered in an accident or due to any other abnormal condition requiring separation. Yet, at the same time, the snap is sufficiently strong to maintain the auxiliary light 100 in place during operation and use of the motorcycle.

The auxiliary headlight is constructed substantially the same as the embodiment disclosed in FIGS. 2-4 and like numerals are utilized to designate like parts. However, the bottom portion 110 of the housing 102 contains an undercut portion 210 defining a circumferential flange surrounding an opening 212 and supporting a spring 214 which constantly urges a cap member 216 mounted over the circumferential flange 210 in an upward direction. The cap member 216 contains a straddle hook 218 which projects downward internally of the spring 214 and over which passes the strap 200 which enters the interior of the spring 214 thorugh the opening 212. Aligned concentric with the straddle hook 218, on top of the cap 216, is a button 220 which projects upward through an opening 222 in the housing top 108.

In operation, the button 220 is depressed so as to urge the spring 214 downwardly so that the hook 218 also moves downward and can engage the strap 200. The button 220 is then released so that the spring 214 urges the cap 216 and consequently the hook 218 upward to pull tight on a strap 200 and, through this tension fit, cause the auxiliary headlight 100 to be urged firmly against the surface of the helmet 26. Rubber feet 224 protect the surface of the helmet 26 and also provides some frictional resistence to movement by the auxiliary headlight 100 so that a secure, yet detachable, fit and mounting is obtained. The auxiliary headlight 100 is removed simply by depressing the button 220 to release the strap 200. The strap hook 208 may then be removed and the helmet worn without the auxiliary headlight 100. Alternatively, in the case of unusual force or impact, as described above, the strap 200 will separate at the point of the snap-fit 206 and the auxiliary light will be freed.

A particular advantage of this embodiment is that the auxiliary headlight may be adjustably displaced along the line of the strap so that it may be located closer to the front or the back of the helmet. This provides adjustability for different riding conditions and a greater adaptability of use.

FIG. 8 shows the auxiliary headlight 100 as detached from the helmet 26. As can be seen, the helmet 26 is thus useful for daytime use without any encumberence of the auxiliary headlight. In addition, it can be seen that the auxiliary headlight 100 may constitute an optional piece of equipment which can be readily secured to a helmet 26 which already has a fastening means such as 122 mounted therein or to a helmet which does not have such mounting means, but is of the conventional type now in use, when using mounting means such as illustrated in the embodiment shown in FIGS. 5 through 7. It will be understood by those skilled in the art that other means of attachment may be utilized such as suction means and other fastening types such as so-called "Velcro" fasteners. Thus, a wide variety of means are available and may be utilized with the presently existing helmets without any need for substantial and expensive modifications.

Figure 9:
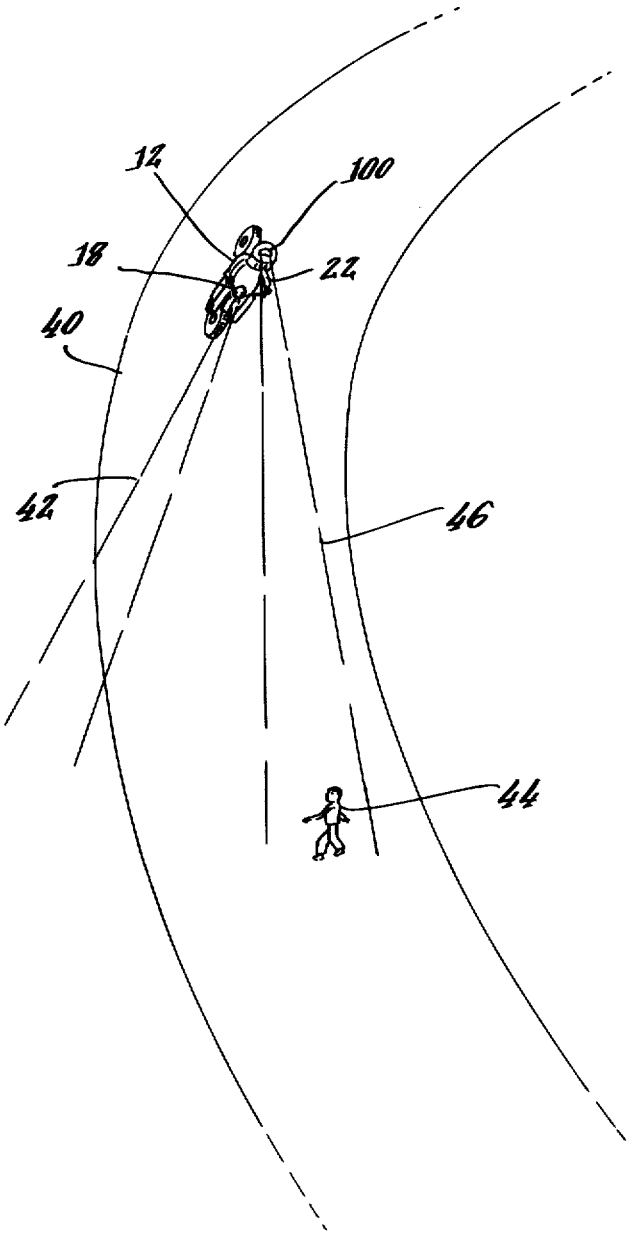
FIG. 9 is a schematic illustration of a motorcycle and operator travelling a curved path and obtaining improved illumination of the path using the lighting system according to this invention.

An important advantage of my invention is illustrated in FIG. 9. FIG. 9 schematically shows a motorcycle 12 and an operator 22 following a curved path of travel represented by a road 40. As previously described, the curve is negotiated by leaning of the motorcycle, which then travels on the side wall treads of its tires, as much as by a result of turning of the front wheel. As a result of this "leaning" through the curve, the main headlight 18 projects a beam, represented by the numeral 42, straight ahead to the side of the road. Consequently, the road directly ahead of the motorcycle is not illuminated and, therefore, obstructions, unilluminated oncoming vehicles, or pedestrians such as indicated at 44, may not be seen by the operator 22. As shown, however, the operator 22 has attached to his safety helmet the auxiliary headlight 100 according to this invention which projects a beam 46 in the direction of the line of sight of the operator 22 to provide a lighting system for the motorcycle 12 that illuminates the road ahead also.

Figure 10:
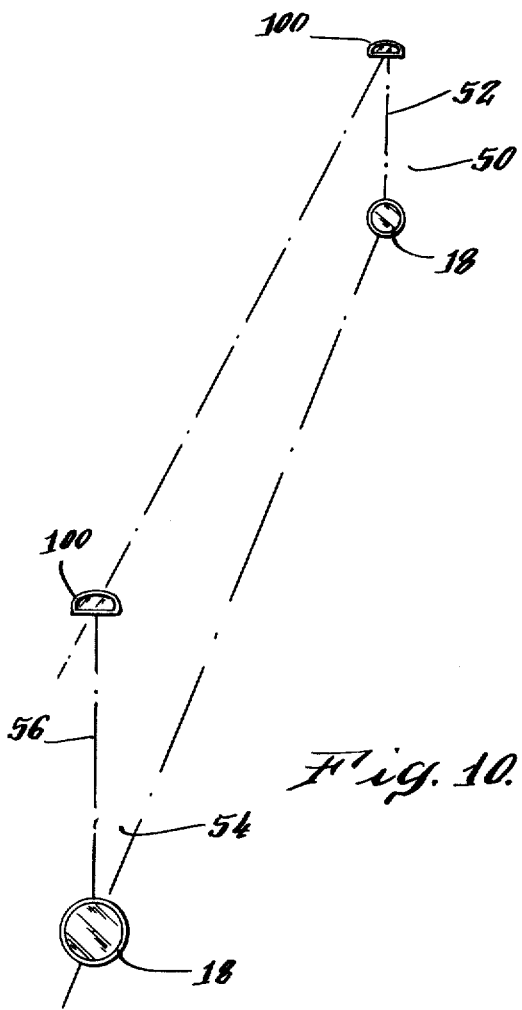
FIG. 10 is a schematic illustration showing the manner in which the two point sources of light of the lighting system according to this invention appear spaced further or closer apart from a location remote therefrom to enable judging of the distance of the vehicle from that location.

FIG. 10 illustrates another safety advantage of the present invention and schemetically shows the two light sources of the main headlight 18 and the auxiliary headlight 100 as they might be viewed from a distance by an oncoming pedestrian or vehicle. This, at the location indicated by the numeral 50 the sources of light 18 and 100 appear closer together through the distance 52 while at the closer location to the observer or viewer 54 the lights 18 and 100 appear spaced further apart through the distance 56. In this manner, a person viewing the lighting system of the motorcycle from a distance can tell, as a result of the space between the two lights, how close or far away the motorcycle is. In contrast, with only one headlight 18 there is no means of judging the closeness of the motorcycle. This is particularly important when it is realized that, although the sources of light are shown with their shapes exaggerated for the purposes of illustration, they will likely appear as merely two point sources which are not indistinguishable from one another except for the distance between them.

Thus, there has been disclosed an improved lighting system for a motorcycle which provides practical advantages for enhancing the safety of motorcycle operation and which utilizes a detachable auxiliary headlight which can be mounted on a conventional safety helmet and is removable therefrom when not required. In addition to the increased illumination of the path of travel of the motorcycle providing for safer operation by the motorcycle operator, the lighting system also enables oncoming vehicles or pedestrians and the like to gauge the distance from the motorcycle so that there is increased safety for all using the roads. The detachable auxiliary headlight is a lightweight compact unit which utilizes the electrical system of the motorcycle and may be operated in conjunction with the main lamp of the motorcycle to project a headlight beam when the main headlight is on to project a high beam or to project a parking light at the time that a low beam is projected by the main beam. In this way, the operator of an oncoming vehicle will not inadvertantly be blinded by the auxiliary headlight. An advantageous safety consequences of the present invention is that it also encourages the use of a safety helmet, at least during nighttime travel when the auxiliary lighting system provides its greatest benefits. However, the auxiliary lighting system is also helpful during daytime use to provide two point sources of light to enable oncoming cars and others to gauge their distance from the motorcycle.

I claim:

1. In a lighting system for an open vehicle carrying an operator exposed to the vehicle surroundings, including a main headlight having means to rigidly secure it to the vehicle for projecting a beam of light forward of the vehicle, an electrical circuit connecting the main headlight to a power source, a switch forming part of the electrical circuit, the switch being located for access by the operator and activatable by the operator to cause the main headlight to project a beam of light, the improvement therein comprising an auxiliary headlight detachably mounted on a helmet worn by the vehicle operator, electrical circuit connecting means detachably connecting the auxiliary headlight to the electrical circuit and switch of the main headlight to be activatable by the operator to project an auxiliary beam of light in conjunction therewith, the auxiliary headlight projecting the auxiliary beam of light in a plurality of directions independent of the direction of the beam of the main headlight at the discretion of the vehicle operator under conditions of vehicle use and the main headlight and the auxiliary headlight being spaced apart in a vertical plane normal to the path of travel of the vehicle to project two distinct separate sources of light when viewed from a remote location in the forward path of travel of the vehicle, whereby improved illumination of the path of travel of the vehicle, enhanced visibility of the vehicle and operator and greater safety of operation is obtained.

2. The improved lighting system as claimed in claim 1 wherein the auxiliary headlight is detachably mounted on the helmet by mounting means enabling mounting and dismounting by hand and providing secure mounting sufficient to withstand the force of wind normally encountered in vehicular use but insufficient to withstand forces due to sudden impact.

3. The improved lighting system as claimed in claim 2 wherein the mounting means are snap-type fasteners, the respective mating portions of which are permanently attached to the helmet and auxiliary headlight, respectively.

4. In a lighting system for an open vehicle carrying an operator exposed to the vehicle surroundings including a main headlight having means to rigidly secure it to the vehicle for projecting a beam of light forward of the vehicle, an electrical circuit connecting the main headlight to a power source, a switch forming part of the electrical circuit, the switch being located for access by the operator and activatable by the operator to cause the main headlight to project a beam of light, the improvement therein comprising an auxiliary headlight detachably mounted on a helmet worn by the vehicle operator by mounting means comprising a strap extending around the outer periphery of the helmet from the back to the front of the helmet, the strap being adjustable to be tightened against the helmet outer surface, a straddle hook located on the auxiliary headlight, the straddle hook having a hook portion which engages the underside of the strap, spring means normally urging the straddle hook away from the strap when the auxiliary headlight is mounted on the helmet in order to provide tension-fit engagement between the hook portion and the strap, the straddle hook being hand actuatably displacable towards the strap for engagement and disengagement of the hook therewith for engaging the strap at a plurality of locations along its length to mount the auxiliary headlight in a plurality of positions along the helmet periphery defined by the strap for convenient auxiliary headlight beam aiming, electrical circuit connecting means detachably connecting the auxiliary headlight to the electrical circuit and switch of the main headlight to be activatable by the operator to project an auxiliary beam of light in conjunction therewith, and the main headlight and the auxiliary headlight being spaced apart in a vertical plane normal to the path of travel of the vehicle to project two distinct separate sources of light when viewed from a remote location in the forward path of travel of the vehicle, whereby the auxiliary headlight may project the auxiliary beam of light in a plurality of directions independent of the direction of the beam of the main headlight and at the discretion of the vehicle operator under conditions of vehicle use and improved illumination of the path of travel of the vehicle, enhanced visibility of the vehicle and operator and greater safety of operation is obtained.

5. The improved lighting system as claimed in claim 4 wherein the strap is secured to the helmet at its forward end by hand operable detachable mounting and dismounting means providing secure mounting sufficient to withstand the force of wind normally encountered in vehicular use by insufficient to withstand forces due to sudden impact.

6. In a lighting system for an open vehicle carrying an operator exposed to the vehicle surroundings including a main headlight having a high beam and a low beam, the main headlight having means to rigidly secure it to the vehicle for projecting a beam of light forward of the vehicle, an electrical circuit connecting the main headlight to a power source, a switch forming part of the electrical circuit, the switch being located for access by the operator and activatable by the operator to cause the main headlight to project a beam of light, the improvement therein comprising an auxiliary headlight comprising a headlight beam and a parking light detachably mounted on a helmet worn by the vehicle operator, electrical circuit connecting means detachably connecting the auxiliary headlight to the electrical circuit and switch of the main headlight to be activatable by the operator to project an auxiliary beam of light in conjunction therewith so that the activation of the switch activates the auxiliary headlight to project a headlight beam when the main headlight is on high beam and to actuate the parking light when the main headlight is on low beam, and the main headlight and the auxiliary headlight being spaced part in a vertical plane normal to the path of travel of the vehicle to project two distinct separate sources of light when viewed from a remote location in the forward path of travel of the vehicle, whereby the auxiliary headlight may project the auxiliary beam of light in a plurality of directions independent of the direction of the beam of the main headlight and at the discretion of the vehicle operator under conditions of vehicle use and improved illumination of the path of travel of the vehicle, enhanced visibility of the vehicle and operator and greater safety of operation is obtained.

7. A headlight for removable attachment to a safety helmet worn by the operator of an open vehicle to provide a headlight beam source auxiliary to an open vehicle conventional lighting system comprising a housing defining a space enclosing lighting means including means for projecting a headlight-type intensity beam, mounting means operatively connected to the housing for detachably mounting the headlight on the helmet, the mounting means comprises a strap extending around the outer periphery of the helmet from the back to the front of the helmet, the strap being adjustable to be tightened against the helmet outer surface, a straddle hook located on the housing, the straddle hook having a hook portion which engages the underside of the strap, spring means normally urging the straddle hook away from the strap when the headlight is mounted on the helmet in order to provide tension-fitting engagement between the hook portion and the strap, the straddle hook being hand actuatably displaceable towards the strap for engagement and disengagement of the hook therewith for engaging the strap at a plurality of locations along its length to mount the headlight in a plurality of positions along the helmet periphery defined by the strap, the mounting means enabling mounting and dismounting by hand and providing secure mounting sufficient to withstand the force of wind normally encountered in vehicular use but insufficient to withstand forces due to sudden impact, the headlight, when mounted, projecting a beam of light in a plurality of directions independent of the vehicle at the discretion of the vehicle operator, and electrical circuit connecting means for detachably connecting the headlight a conventional lighting system of the vehicle.

8. The headlight as claimed in claim 7 wherein the strap is secured to the helmet at its forward end by hand operated detachable mounting and dismounting means providing secure mounting sufficient to withstand the force of wind normally encountered in vehicular use but insufficient to withstand forces due to sudden impact.

9. The headlight as claimed in claim 7 wherein the vehicle conventional lighting system includes a main headlight for projecting a high beam and a low beam and a switch activatable to select any of these beams, the helmet mountable headlight comprises a headlight beam and a parking light, and the electrical circuit connecting the headlight to the vehicle lighting system is connected therewith so that activation of the switch activates the helmet mountable headlight to project a headlight beam when the main headlight is on high beam and to project a parking light when the main headlight is on low beam.

10. A headlight for removable attachment to a safety helmet worn by the operator of an open vehicle to provide a headlight beam source auxiliary to an open vehicle conventional lighting system comprising a housing defining a space enclosing lighting means including means for projecting a headlight-type intensity beam, mounting means operatively connected to the housing for detachably mounting the headlight on the helmet, the mounting means enabling mounting and dismounting by hand and providing secure mounting sufficient to withstand the forces of wind normally encountered in vehicular use but insufficient to withstand forces due to sudden impact, such that the headlight breaks free from the helmet without injury to the wearer under sudden impact forces, the headlight, when mounted, projecting a beam of light in a plurality of directions independent of the vehicle at the discretion of the vehicle operator, and electrical circuit connecting means for detachably connecting the headlight to a conventional lighting system of the vehicle.

* * * * *